(12) United States Patent
Smukowski (10) Patent No.: US 7,103,567 B2
(45) Date of Patent: Sep. 5, 2006

(54) SYSTEM AND DEVICE FOR PRODUCT VALUATION AND ASSOCIATED METHOD

(75) Inventor: David J. Smukowski, Bellevue, WA (US)

(73) Assignee: The Boeing Company, Seattle, WA (US)

( * ) Notice: Subject to any disclaimer, the term of this patent is extended or adjusted under 35 U.S.C. 154(b) by 665 days.

(21) Appl. No.: 09/908,095

(22) Filed: Jul. 18, 2001

(65) Prior Publication Data

US 2003/0028438 A1    Feb. 6, 2003

(51) Int. Cl.
   *G06Q 30/00*    (2006.01)
(52) U.S. Cl. .......................................... 705/26; 705/37
(58) Field of Classification Search ................. 705/26, 705/27, 37; 707/10
   See application file for complete search history.

(56) References Cited

U.S. PATENT DOCUMENTS

| 6,236,990 | B1 * | 5/2001 | Geller et al. .................... 707/5 |
| 6,260,024 | B1 * | 7/2001 | Shkedy .......................... 705/37 |
| 2002/0174022 | A1 * | 11/2002 | Tenorio ........................ 705/26 |

FOREIGN PATENT DOCUMENTS

KR                413695 B    * 10/2000

OTHER PUBLICATIONS

"B2B surprise: The survivors"; Julia King; Computerworld; Dec. 11, 2000.*
Screen captures of exostar.com WebPages obtained via archive.org.*

* cited by examiner

*Primary Examiner*—Mark A Fadok
*Assistant Examiner*—Robert E. Rhode, Jr.
(74) *Attorney, Agent, or Firm*—Alston & Bird LLP (57) ABSTRACT

A method of indicating relative values of products offered to a customer is provided, wherein the method is implemented by an intermediary over a computer network. Initially, a request is received by the intermediary over the computer network from a vendor. The request is directed to including a description of at least one product for sale by the vendor on a product list. A product evaluation is then performed for each of the at least one product according to a plurality of predetermined evaluation criteria. Thereafter, an inquiry is received from a customer, over the computer network, regarding a specific product. In response to the inquiry, the customer is provided with, over the computer network, the description of any product on the product list corresponding to the specific product, wherein each corresponding product description has the respective product evaluation and the vendor associated therewith so as to facilitate a product selection by the customer. An associated system and computer device for implementing the method are also provided.

23 Claims, 2 Drawing Sheets

SYSTEM AND DEVICE FOR PRODUCT VALUATION AND ASSOCIATED METHOD

FIELD OF THE INVENTION

The present invention relates to remote purchase processing systems and, more particularly, to a system, computer device, and associated method for product valuation.

BACKGROUND OF THE INVENTION

Many industries produce complex systems that are subject to stringent scrutiny and regulation over the course of the service life of that system. Such complex systems may include, for example, aircraft, rail systems, medical systems, weapon systems, and power generation systems where maintenance of such complex systems must be performed according to, for instance, state, federal and/or international regulations administered by one or more corresponding agencies. As a result, an owner of such a complex system generally must be extremely selective when obtaining replacement or spare parts for that system.

Such a situation is present with, for example, commercial aircraft sold by a manufacturer thereof to an airline which uses the aircraft as part of its fleet. These aircraft such as, for example, the Models 707, 717, 727, 737, 747, 757, 767, MD-11, MD-80, etc. produced by the Boeing Company are extremely complex and expensive systems that face stringent scrutiny from the Federal Aviation Administration ("FAA") in areas related to, for instance, safety and maintenance. Of course, the scrutiny may vary between essential and non-essential parts. In any case, parts availability is a major concern for owners of such complex systems. In some instances, the owner must keep and maintain costly inventories of parts, especially "hard to find" parts. Alternatively, the owner must dedicate both manpower and monetary resources specifically for locating and procuring the appropriate parts from qualified vendors as the need arises. With this type of procurement process, the owner risks, for example, down time of the system if the required parts cannot be timely obtained. Such common procedures are often costly for the system owner, in terms of both expense and time.

In either instance, the parts purchasing process is difficult, costly, and time consuming. Typically, vendor salespeople call, write, and/or visit the owner's purchasing agent so as to describe and/or exhibit the product or part being sold. At the same time, the salesperson is often trying to favorably differentiate his/her product over competitors' products by describing an overall "value" of the product. However, when described in this manner, the "value" of the product is typically subjective, while providing little consistent information with which the buyer can make an objective purchasing decision. In addition, if the buyer has no experience with the particular vendor, the purchasing process may become even more costly where the chosen vendor fails to perform, since often little or no recourse is available to the owner/customer. The owner may also incur additional costs from system down time, efforts to find a replacement vendor, or the like. Further, such an unreliable vendor may also adversely affect many system owners unless others in the industry are notified of the that vendor's practices. However, there is often no mechanism for industry-wide notification that would effectively notify others in the industry.

More particular instances of difficulties in parts purchasing include, for example, instances where the specific part may lack critical information when listed for sale. For instance, a particular part may be used or refurbished and may lack a warranty or guarantee. Even if the buyer is able to compile information with regard to the particular part being procurable from several different vendors, the information may only reveal the price and general availability of the part. As a result, the buyer may not be able to effectively compare the actual relative values of the parts available from the various vendors. Thus, there exists a need for a system which would present a compilation of parts comprising the complex system and the corresponding vendors, wherein this information would be accessible to buyers and/or owners of the appropriate complex system. Such a system should allow the buyer to post a query about a particular part and be presented with a reply including the vendors from which the queried part is available. The system should further allow the buyer to make an objective purchasing decision based upon the actual attributes of the particular part available from each identified vendor. There also exists a need for a system which would apply a predetermined standardized criteria to each part available to the buyer so as to allow the buyer to make an expedited and objective purchasing decision with regard to the particular part and the corresponding value desired by the buyer. Such a system should also comprise a mechanism for rating the vendors providing the particular part including, for example, vendor reliability and the like.

However, the vendor side of such an industry may also face similar limitations in providing parts to a customer that meet the customer's stated needs. For example, vendors may retain, at considerable expense, salespeople to call, write, visit, or otherwise contact the potential customers. These salespeople must effectively describe the value of the vendor's products over those of a competing vendor in order to obtain the customer's business. The efforts of the vendor may also be hindered by intermediaries, brokers, competitors, or the like disseminating inaccurate information to the potential customer about their product or the vendor's product. Thus, there exists a further need for a system that provides accurate and acceptable vendor information to buyers, wherein the endorsement of such a system by buyers would persuade vendors to participate. Accordingly, such a system would require all participating vendors to abide by particular business practice guidelines which would be effectively monitored to assure compliance.

SUMMARY OF THE INVENTION

The above and other needs are met by the present invention which, in one embodiment, provides a method of indicating relative values of products offered to a customer, wherein the method is implemented by an intermediary over a computer network. Initially, a request is received by the intermediary over the computer network from a vendor. The request is directed to including a description of at least one product for sale by the vendor on a product list. A product evaluation is then performed for each of the at least one product according to a plurality of predetermined evaluation criteria. Thereafter, an inquiry is received from a customer, over the computer network, regarding a specific product. In response to the inquiry, the customer is provided with, over the computer network, the description of any product on the product list corresponding to the specific product, wherein each corresponding product description has the respective product evaluation and the vendor associated therewith so as to facilitate a product selection by the customer.

Prior to including the description of the at least one product on the product list, the vendor may be required to complete a registration procedure, a qualification procedure, and/or a vendor agreement procedure. In some instances, the vendor may also be required to apply the plurality of predetermined criteria to the at least one product. Further, the customer may also be required to complete a registration procedure before being provided with a description of any product on the product list corresponding to the specified product. Once the product evaluation is completed, a rating scale having discrete levels may be applied to the product evaluation for each of the at least one product in order to correlate the product evaluation with one of the discrete levels so as to thereby assign a corresponding discrete level to each of the at least one product. Accordingly, the customer may be provided with the corresponding discrete level and/or price for each of the at least one product as part of description of the product. In some instances, a predetermined service package is provided to the customer, corresponding to the discrete level assigned to the product, if the customer purchases the product. If the customer decides to purchase the specific product, the purchase may be facilitated by establishing contact between the customer and the vendor. Alternatively, the product may first be obtained by the intermediary from the vendor and then delivered to the customer.

Another advantageous aspect of the present invention comprises a system for implementing the associated method of indicating relative values of products offered to a customer, as described herein. Such a system may be implemented in computer software, or a combination of computer software and hardware, having one or more processing portions for accomplishing an associated method according to other embodiments of the present invention. In a representative embodiment, an electronic searchable product list is initiated and established on a central computer or computer device that is part of a larger computer network such as, for example, the Internet. Such a central computer or computer device may comprise, for example, a desktop personal computer, a laptop personal computer, a server, a router, a mainframe computer or like devices or combinations thereof capable of implementing the described functions as known to one skilled in the art. Once established on the central computer or computer device, the product list is accessible to a customer (also referred to herein as "buyer") through a customer's computer and to vendor through a vendor's computer, with each of the computers being an integral part of the computer network and communicable with the central computer or computer device through, for example, network communication lines.

The searchable product list may be used by the vendor to list products (also referred to herein as "parts") for sale, wherein the products are applicable to a particular complex system in the possession of the customer. The product list is typically implemented by a product listing module on the central computer or computer device. Generally associated with a product listing module on the central computer or computer device are a customer registration module, a vendor registration module, a product evaluation module, a vendor evaluation module, and a service level administration module. In order to list a product, the vendor accesses the central computer, via the vendor's computer, over the network communication lines that are in communication with the central computer or computer device. The vendor then provides registration information to the vendor registration model, before providing details of the product to be listed to the product evaluation module. The product to be listed in then provided with a corresponding service level designation by the service level administration module. Thereafter, the evaluated product is listed on the searchable product list in the product listing module.

To search for a specific product, the customer access the central computer via the customer's computer and provides registration information to the customer registration module. The customer is then able to search the product list to find the specific product, whereafter the customer is provided with the corresponding product information and service level designation by the product listing module. The customer may also provide, and/or be provided with, a vendor evaluation by the vendor evaluation module. Thus, with this system, the vendor is able to list products which are thereafter searchable by the customer via the respective computers over the network communication lines, wherein the customer is provided with a service level designation for the product corresponding to a standard evaluation criteria so as to facilitate product selection.

These elements, alone or in combination, are capable of implementing the associated method of indicating relative values of products offered to a customer according to embodiments of the present invention. The customer registration module, the vendor registration module, the product evaluation module, the vendor evaluation module, the service level administration module, and the product listing module are generally implemented in computer software, though the system may also, in some instances, be implemented by a combination of software and hardware, for example, where the system encompasses other remote computers, displays, or the like. Further, the customer registration module, the vendor registration module, the product evaluation module, the vendor evaluation module, the service level administration module, and/or the product listing module may produce databases that are generally stored in, for instance, a memory device incorporated within or otherwise associated with the central computer or computer device. In addition, the central computer may, for example, at least partially include or be disposed in communication with a router, server, switch, or the like for communicating with the customer's computer and the vendor's computer, but may also be configured to comprise at least a portion of one of the computers in communication therewith. These elements thus form a system for implementing the associated method according to embodiments of the present invention.

Embodiments of the present invention therefore provide a system which includes a compilation of parts comprising a complex system that are available for purchase from corresponding vendors, wherein this information is accessible to buyers and/or owners of a corresponding complex system. Embodiments of such a system also allow the buyer to post a query about a particular part and, in turn, receive a reply including the vendors from which the queried part is available. Embodiments of the system further allow the buyer to make an objective purchasing decision based upon the actual attributes of the particular part available from each identified vendor by applying a predetermined standardized criteria to each part available to the buyer. This allows the buyer to make an expedited and objective purchasing decision as to the particular part and the corresponding value desired by the buyer. Such a system also includes a mechanism for rating the vendors providing the particular part, including such information as, for example, vendor reliability, past performance, positive and/or negative reports, and the like. Such a system provides accurate and acceptable vendor information to buyers, wherein the endorsement of such a system by owners/buyers may persuade vendors to participate. Embodiments of the system further require all participating vendors to abide by particular business practice guidelines, by completing a vendor agreement, wherein the vendors are effectively monitored and allowed to participate in the system based on continued compliance with the agreement.

Thus, embodiments of a system according to the present invention effectively streamline the purchasing process for parts for complex systems by allowing buyers to query a central source for parts availability and corresponding vendors. A predetermined standardized criteria is applied to all parts listed by the vendors so as to provide the buyers with a consistent representation of the value of each product matching the query. The buyer is also provided with a mechanism for investigating the particular vendor for a chosen part so as to minimize risk in the transaction. Thus, by centralizing the parts acquisition process, applying a standardized criteria to the available parts, and providing a vendor accountability element, embodiments of a system according to the present invention provide savings and value to both buyer and vendor in terms of, for example, time, manpower, lost service time, expense, and other issues associated with the parts purchasing process. Therefore, methods and systems of indicating relative values of products offered to a customer, according to embodiments of the present invention, provide significant advantages as detailed herein.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
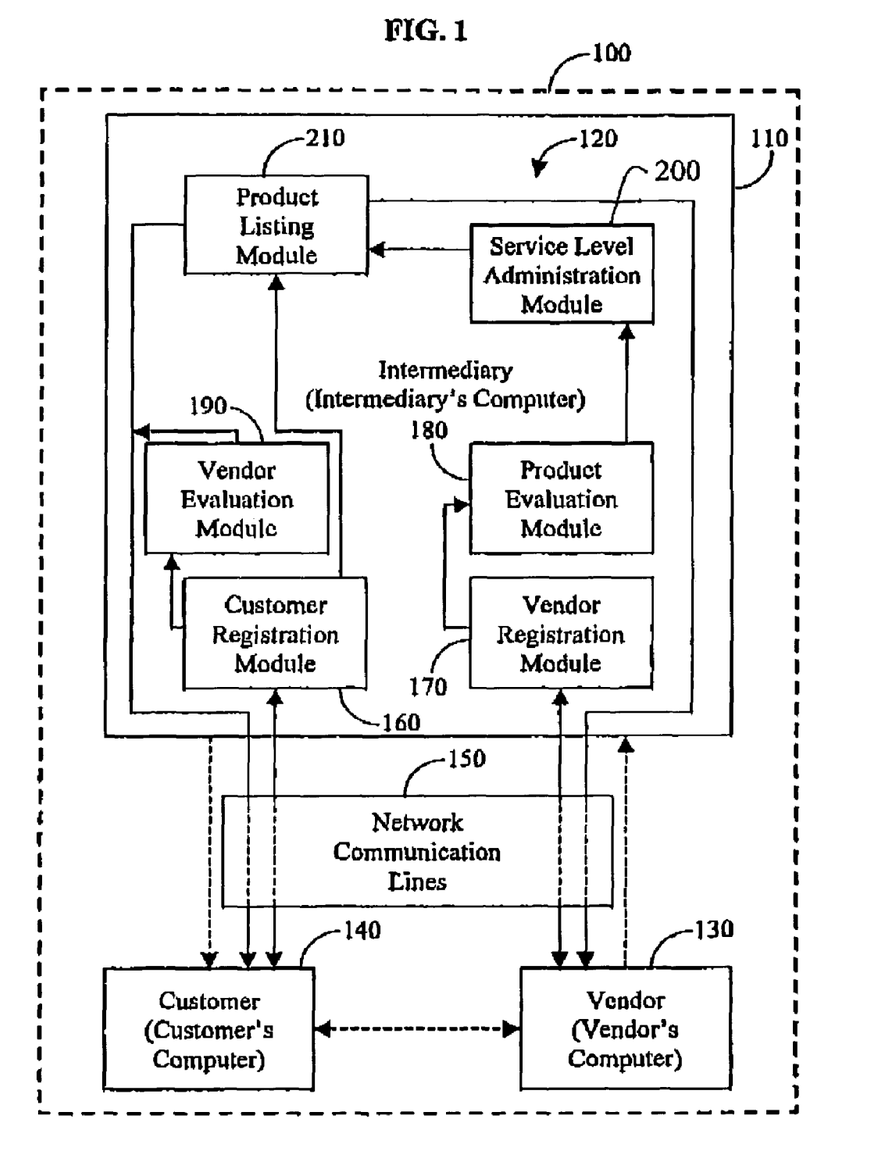
FIG. 1 is a schematic representation of a system for indicating relative values of products offered to a customer according to one embodiment of the present invention.

FIG. 1 is a schematic representation of a system, operating over a computer network, for indicating relative values of products offered to a customer according to one embodiment of the present invention and is representative of a system capable of implementing a method of indicating relative values of products offered to a customer in accordance with further embodiments of the present invention. The product valuation system 120 is initiated and developed on a central computer or other computer device 110 and administered by an intermediary, wherein the central computer or other computer device 110 is part of a larger computer network 100 such as, for example, the Internet. Such a central computer or computer device 110, referred to herein as "central computer 110" for convenience and brevity, may comprise, for example, a desktop personal computer, a laptop personal computer, a server, a router, a mainframe computer or like devices or combinations thereof capable of implementing the functions and methods described herein as will be appreciated by one skilled in the art.

Once established on the central computer 110, the system 120 is accessible to a customer 130 through a customer's computer and to a vendor 140 through a vendor's computer, with each of the computers being an integral part of the computer network 100 and communicable with the central computer 110 through, for example, network communication lines 150. Note that, while a simple schematic of several computers in communication with a computer network is presented herein, it is understood that this concept is representative of communication through an Internet site on, for example, the World Wide Web, and may involve many different computers and associated equipment, wherein the concept of communication via the Internet is known to one skilled in the art. Note that the intermediary or intermediary's computer 110 is typically remote from and independent of the customer 140 (and the corresponding customer's computer) and the vendor 130 (and the corresponding vendor's computer). However, in some instances, embodiments of the system and corresponding method described herein as being performed by the central computer 110 may be hosted by a customer's computer 140 or a vendor's computer 130, in which case the customer 140 or vendor 130 may also serve as the intermediary 110 consistent with the spirit and scope of the present invention.

In order to establish a product valuation system 120 such as, for example, by establishing a searchable product list on which a vendor 130 may list a product and a customer 140 may search for a specific product, a vendor 130 accesses the central computer 110 via the vendor's computer over the network communication lines 150. Generally associated with a product valuation system 120 on the central computer 110 are a customer registration module 160, a vendor registration module 170, a product evaluation module 180, a vendor evaluation module 190, a service level administration module 200, and a product listing module 210. The customer 140, in turn, registers with the customer registration module 160 via the network communication lines 150 so as to be able to access and search the product list and/or participate in a transaction. Note that the vendor's computer 130 and the customer's computer 140 may each generally comprise any computer device or terminal configured to be communicable with the central computer 110, wherein a single computer device or terminal may, in some instances, comprise one or more of the computer elements. For example, a single computer device may comprise both the vendor's computer 130 and the customer's computer 140 where an entity both sells and buys products over the product valuation system 120.

The product valuation system 120, including the searchable product list, is generally implemented in computer software, though the system 120 may also, in some instances, be implemented in a combination of software and hardware. The information gathered through the customer registration module 160, the vendor registration module 170, the product evaluation module 180, the vendor evaluation module 190, the service level administration module 200, and the product listing module 210 are generally stored in, for example, one or more databases in a memory device incorporated within or otherwise associated with the central computer 110. Accordingly, the system 120 may provide data mining opportunities as will be realized by one skilled in the art. Further, the customer registration module 160, the vendor registration module 170, the product evaluation module 180, the vendor evaluation module 190, the service level administration module 200, and the product listing module 210 are typically implemented in computer software, though these components may be implemented by a combination of software and hardware, in some instances. For example, the product listing module 210 may include or be disposed in communication with a router, server, switch, or the like, for appropriately allowing access thereto for listing and searching products by vendors 130 and customers 140, respectively. In addition, the product listing module 210 may comprise, for instance, a display or other mechanism for presenting text, graphics, audio, or the like to confirm vendor's 130 and/or customer's 140 interactions with the product list and/or to provide other information associated with the system 120. Generally, these elements comprise a system 120, implemented in computer software or a combination of software and hardware, having one or more processing portions capable of executing embodiments of a method of indicating relative values of products offered to a customer according to the present invention. Thus, embodiments of such methods according to the present invention may be implemented by one or more corresponding processing portions of an associated system or computer device, wherein each processing portion may comprise a software component, or both a software and hardware component, capable of implementing one or more of the specified functions. Accordingly, the operation of the product valuation system 120 and its associated elements may be more particularly illustrated from the description of an associated method corresponding to one embodiment of the present invention.

FIGS. 2-5 are schematic representations of a method of indicating relative values of products offered to a customer according to one embodiment of the present invention. As detailed herein, the described method may allude to a representative example involving the aircraft industry where the customer 140 is, for example, an airline seeking a particular part for an aircraft in its fleet and the vendor 130 is, for instance, an OEM parts supplier, a parts rebuilder, or another airline having extra parts in its inventory, each having a product corresponding to the particular part sought by the customer 140. However, it will be understood that the present invention is not limited to aircraft, but may include and be applicable to a variety of industries such as, for example, military systems, computers and computer systems, railroads, or power generation systems, wherein a parts buyer is able to benefit from a centralized parts locator having a standardized rating system for the parts listed thereon. More generally, the present invention may be applicable to a basic retail environment where multiple products are each available from multiple vendors. Note also that the present invention may also be applicable to a variety of other situations besides or in addition to products. For example, services offered by various service providers may also be evaluated and listed in the same manner as described herein. Thus, the examples presented herein are not intended to be inclusive or to limit the applicability of embodiments of the present invention, but are presented to illustrate possible applications consistent with the spirit and scope of the present invention.

Figure 2:
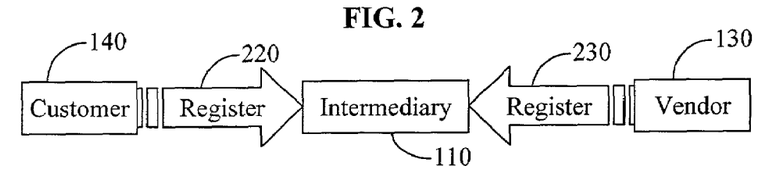
FIGS. 2–5 are schematic representations of a method of indicating relative values of products offered to a customer according to one embodiment of the present invention.

As shown in FIG. 2, a vendor 130 wishing to list a product for sale on the product list and a customer 140 wishing to purchase a specific product must each register with the intermediary via the central computer 110 via the respective computers and over the network communication lines 150. In one example of an application of embodiments of the present invention, the customer 140 may comprise, for example, an airline in need of a particular part for one or more aircraft within its fleet, while the vendor 130 may comprise, for instance, an original equipment manufacturer (OEM) selling parts, another airline having spare parts in its inventory, another airline having used parts, a parts rebuilder having rebuilt/remanufactured parts, or an aftermarket parts manufacturer/supplier. In order to register 220 with the intermediary 110, via the customer registration module 160, the customer 140 may be asked to provide, for example, a business name and address, any applicable registration numbers, the model and serial numbers of the aircraft within its fleet, and a statement or other data related to creditworthiness. In turn, the vendor 130 may be asked to provide to the intermediary 110 through the vendor registration module 170, for instance, a business name and address, any applicable registration numbers, licenses, and/or certifications, and an indication of the history and/or financial status of the business in a vendor registration process 230. Note that the vendor registration process 230 may vary in the level of scrutiny applied to the registering vendor 130. In some instances, the vendor 130 may only be required to supply identification and contact information. However, in other instances, the vendor 130 may be required to complete a vendor qualification process including such criteria as, for example, supplying any applicable OEM certification status, verifying the ability to honor warranties, providing guarantees of performance, or the like. It will be understood, however, that any number of other criteria may be applied so as to appropriately qualify the vendor 130 according to the purpose of the system 120 and the demands of the customer 140. In addition, the vendor 130 may be required to execute an agreement, for example, to accurately evaluate each product to be listed for sale, according to predetermined criteria supplied by the intermediary 110, before being permitted to provide details of the product to be listed to the product evaluation module 180.

Figure 3:
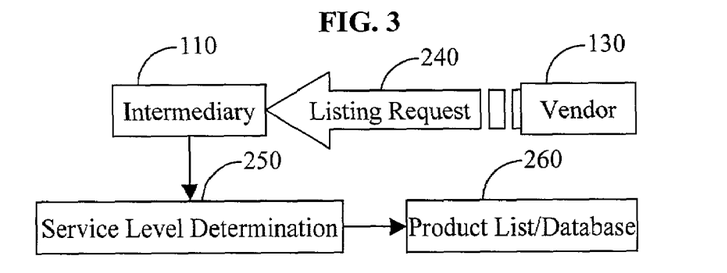

Following the respective registration processes, FIG. 3 shows that, in order to list a product for sale, the vendor 130 provides a listing request 240 to the intermediary 110. The listing request 240 requests that a product be listed for sale on the searchable product list implemented by the product listing module 210. The listing request 240 may further require the vendor 130 to provide data describing the product to be listed in detail. For example, the vendor 130 may be asked to provide an applicable product category indication, any corresponding part numbers, the specific applicability of the part, any necessary related parts, any interchangeability data, or the like. In addition, as part of the listing request 240, the vendor 130 is required to provide product evaluation data to be used to indicate the value of the listed product corresponding to the parameters, for example, most useful to or demanded by the customers 140 in order for a customer 140 to expedite a product purchasing decision. The vendor 130 may thus be required to provide, for instance and in accordance with the executed vendor agreement, whether the part is a new, rebuilt/refurbished/remanufactured, used, or surplus part; whether the part is warranted or certified; the pricing structure for the part (i.e. whether there are available volume discounts, whether the intermediary 110 is being paid on a commission or fee basis, whether the vendor 130 has set a fixed price or has placed the part up for auction, and/or whether the parts are priced as a function of availability and/or location, and/or as a percentage of a catalog price); the terms of available credit from the intermediary 110 or the vendor 130; shipping options; part return conditions; or the like. Note that the required information is presented herein for example only and one skilled in the art will appreciate that the information which must be provided by the vendor 130 may vary greatly according to the spirit and the scope of the present invention in order to accomplish the goals of the system 120.

Once the necessary information has been provided by the vendor 130, an evaluation of the product is performed by the product evaluation module 180 by extracting the required data from the information provided by the vendor 130. A service level determination 250 is then performed by the service level administration module 200 so as to provide the product to be listed with a corresponding service level designation. The service level designation is configured to impart, for example, a standard rating system to the part and its accompanying terms of availability in a relatively simple format conducive to an expedited purchasing decision. In essence, a customer 140 is provided with a mechanism for expeditiously discriminating between similar products based upon parameters generally associated with a purchasing decision in the particular industry. For example, where aircraft parts are concerned, a service level designation scale may be assigned as follows:

| | |
|---|---|
| Level 1 | Intermediary is paid on commission basis by vendor |
| | Intermediary has available credit with which to purchase part from vendor and will allow the customer to have the part on credit for a certain time period |
| | Part is new or factory refurbished from OEM and carries records, full warranty, and certification by OEM with return rights |
| | Intermediary may assume responsibility for part |
| | Transaction and delivery arranged through intermediary |
| Level 2 | Intermediary is paid on commission basis by vendor |
| | Intermediary has available credit with which to purchase part from vendor and will allow the customer to have the part on credit for a certain time period |
| | Part is new or refurbished from non-OEM qualified source (inventory of other airline, authorized repair center, other authorized third party) with records, limited return rights, and limited warranty |
| | Intermediary may assume responsibility for part |
| | Transaction and delivery arranged through intermediary |
| Level 3 | Intermediary is paid on fee basis by vendor |
| | Restricted credit may be available from vendor, intermediary, or third party source |
| | Part is new, used, or refurbished from identified source with records and certification, but no warranty or return rights |
| | Intermediary assumes no responsibility for part |
| | Transaction and delivery arranged between vendor and customer |
| Level 4 | Intermediary is paid on fee basis by vendor from vendor auction of part |
| | No credit available |
| | Part is surplus and/or otherwise classified (used or out of service) with no records, warranty, or certification and no return rights |
| | Intermediary assumes no responsibility for part |
| | Transaction and delivery arranged between vendor and customer |
| Level 5 | Intermediary is paid on a fee basis by customer from a customer auction of part |
| | Customer posts part requirement and target terms |
| | Intermediary assumes no responsibility for part |
| | Transaction and delivery arranged between vendor and customer |

The service level designation provides assurances that the customer 140 will receive the services attendant with the level corresponding to the chosen product, in some cases as guaranteed by the intermediary 110. However, it will be appreciated by one skilled in the art that the service level designations by which the products are rated may assume many different forms consistent with the goals of the system 120, the intermediary 110, and the spirit and scope of the present invention. Thereafter, the evaluated product is listed 260 on the searchable product list implemented by the product listing module 210, along with the corresponding service level designation.

Figure 4:
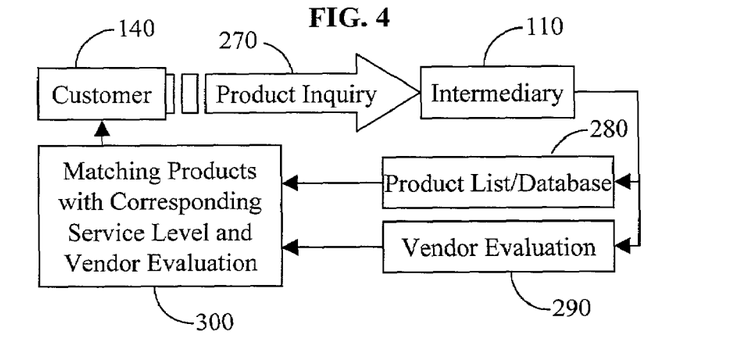

As shown in FIG. 4, to search for a specific product, the customer 140 access the central computer 110 via the customer's computer and provides registration information to or confirms a previous registration with the customer registration module 160. Note also that, in some instances, the scrutiny imposed on the customer 140 during the registration process 220 may vary, wherein the customer 140 is assured that the purchasing process is only open to registered customers and is allowed access to certain parts and/or service based at least partially upon the applied level of scrutiny according to embodiments of the present invention. The customer 140 then sends a specific product inquiry 270 to the central computer 110. Based on the customer's inquiry, the product list and/or database is queried 280 to find the specific product. If a corresponding product is found in the product list, the customer 140 is provided with the product listing, any associated product information, and the corresponding service level designation 300 by the product listing module 210. In some instances, more than one listed product may correspond to the product inquiry 270, in which case, the customer 140 is provided with the data for each matching product.

According to some embodiments of the present invention, the information 300 provided to the customer 140 in response to the customer's inquiry may include a vendor evaluation 290 from the vendor evaluation module 190. The vendor evaluation 290 may include, for example, any relevant information provided by the vendor 130 during the vendor registration process 230 or testimonials provided by past customers 140. If the customer 140 opts to complete a transaction for a particular listed part, the vendor evaluation module 190 may also prompt and/or allow the customer 140 to provide an evaluation of the transaction with the particular vendor 130. The vendor evaluation feature, therefore, provides feedback on particular vendors 130 in order to monitor compliance with the vendor agreement executed by the vendor 130 during the registration process. Thus, with this system, the vendor 130 is able to list products which are thereafter searchable by the customer 140 via the respective computers over the network communication lines 150, wherein the customer 140 is provided with a service level designation for the product corresponding to a standard evaluation criteria so as to facilitate product selection and purchasing decisions.

Figure 5:
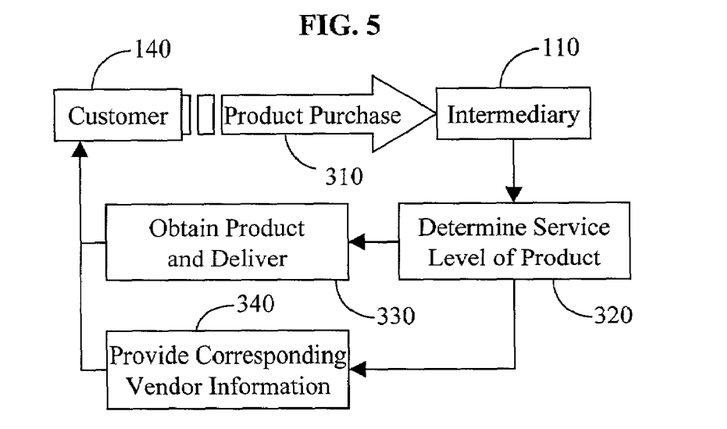

As shown in FIG. 5, once the customer 140 makes a decision to purchase a particular product from the product list, the customer provides a product purchase notification 310 to the intermediary 110. The intermediary 110 thereafter determines the service level corresponding to the chosen product 320. For some service levels, the intermediary 110 may obtain the product 330 from the corresponding vendor 130 and deliver the product to the customer 140 under predetermined credit terms consistent with the service level. For other service levels, the intermediary 110 may provide the customer 140 with the corresponding vendor information 340 so as to allow the customer 140 to arrange the transaction with the vendor 140 for the specified product independently of the intermediary 110. Note that the illustrated procedure subsequent to the product purchase decision is an example according to one embodiment of the present invention. It will be appreciated by one skilled in the art that the transaction may assume many different forms consistent with goal of the system 120, the intermediary 110, and the spirit and scope of the present invention.

Thus, embodiments of the present invention provide a system which establishes a database for parts comprising a complex system, wherein the parts are available for purchase from corresponding vendors. The vendors are registered and/or qualified under an agreement to accurately evaluate the listed parts according to a standard evaluation criteria. This information is accessible to buyers and/or owners of a corresponding complex system. Embodiments of such a system also allow the customer to post a query about a particular part and, in turn, receive a reply including the vendors from which the queried part is available. Embodiments of the system further allow the buyer to make an objective purchasing decision based upon the actual attributes of the particular part available from each identified vendor by providing the buyer with parts evaluated according to a predetermined standardized criteria. This allows the buyer to make an expedited and objective purchasing decision as to the particular part having the corresponding value desired by the buyer. Such a system also includes a mechanism for rating the vendors providing the particular part, including such information as, for example, vendor reliability, past performance, positive and/or negative reports, and the like. Such a system provides accurate and acceptable vendor information to buyers, wherein the endorsement of such a system by owners/buyers may persuade vendors to participate. Embodiments of the system further require all participating vendors to abide by particular business practice guidelines, by completing a vendor agreement, wherein the vendors are effectively monitored and allowed to participate in the system based on continued compliance with the agreement.

Thus, embodiments of a system according to the present invention effectively streamline the purchasing process for parts for complex systems by allowing buyers to query a central source for parts availability and corresponding vendors. A predetermined standardized criteria is applied to all parts listed by the vendors so as to provide the buyers with a consistent representation of the value of each product matching the query. The buyer is also provided with a mechanism for investigating the particular vendor for a chosen part so as to minimize risk in the transaction. Thus, by centralizing the parts acquisition process, applying a standardized criteria to the available parts, and providing a vendor accountability element, embodiments of a system according to the present invention provide savings and value to both buyer and vendor in terms of, for example, time, manpower, lost service time, expense, and other issues associated with the parts purchasing process.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An intermediary computer device for use by an intermediate party and to implement a system for indicating relative values of products offered to a customer over a computer network, the intermediary computer device comprising:

a processing portion for receiving a request to include a description of at least one product on a product list maintained by the intermediate party, the request being received over the computer network from a vendor computer device;

a processing portion for performing a product evaluation for each of the at least one product according to a plurality of predetermined evaluation criteria administered by the intermediate party;

a processing portion for applying a rating scale having discrete levels to the product evaluation for each of the at least one product so as to thereby assign a corresponding discrete level to each of the at least one product;

a processing portion for receiving an inquiry regarding a specific product, the inquiry being received by the intermediate party over the computer network from a customer computer device;

a processing portion for providing to the customer, in response to the inquiry and over the computer network, the description of any product on the product list corresponding to the specific product, each corresponding product description having the respective established product evaluation, the associated discrete level, and a vendor associated therewith;

a processing portion for designating a service package associated with the product and corresponding to the discrete level assigned thereto, and providing an indicia of the service package to the customer, the service package including a designated level of responsibility for the product, corresponding to the discrete level, as assumed by the intermediate party; and a processing portion for receiving a selection of the product from the customer, the product selection including the indicia informing the customer of the associated service package.

2. A computer device according to claim 1 further comprising a processing portion for requiring the vendor to complete at least one of a registration procedure, a qualification procedure, and a vendor agreement procedure prior to the request-receiving processing portion receiving the vendor's request to include the description of the at least one product on the product list.

3. A computer device according to claim 2 further comprising a processing portion for requiring the vendor to apply the plurality of predetermined criteria to the at least one product.

4. A computer device according to claim 1 further comprising a processing portion for requiring the customer to complete a registration procedure prior to the customer-providing processing portion providing to the customer the description of any product on the product list corresponding to the specific product.

5. A computer device according to claim 1 wherein the customer-providing processing portion is further configured to provide a price for each product on the product list corresponding to the specific product to the customer.

6. A computer device according to claim 1 further comprising a processing portion for facilitating a purchase by the customer of the product on the product list corresponding to the specific product by directing establishment of contact between the customer and the vendor.

7. A computer device according to claim 1 further comprising a processing portion for facilitating a purchase by the customer of the product on the product list corresponding to the specific product by directing acquisition of the product from the vendor and directing delivery of the product to the customer.

8. A system for indicating relative values of products offered to a customer, said system being implemented over a computer network and comprising:
- a first computer device adapted to be used by the customer and configured to be in communication with a computer network;
- a second computer device adapted to be used by a vendor and configured to be in communication with the computer network;
- a third computer device adapted to be used by an intermediate party and configured to be in communication with the first and second devices over the computer network, the third computer device comprising:
  - a processing portion for receiving a request to include a description of at least one product on a product list maintained by the intermediate party, the request being received over the computer network from the vendor;
  - a processing portion for performing a product evaluation for each of the at least one product according to a plurality of predetermined evaluation criteria administered by the intermediate party;
  - a processing portion for applying a rating scale having discrete levels to the product evaluation for each of the at least one product in order to correlate the product evaluation with one of the discrete levels so as to thereby assign a corresponding discrete level to each of the at least one product;
  - a processing portion for receiving an inquiry regarding a specific product, the inquiry being received by the intermediate party over the computer network from the customer;
  - a processing portion for providing to the customer, in response to the inquiry and over the computer network, the description of any product on the product list corresponding to the specific product, each corresponding product description having the respective established product evaluation, the associated discrete level, and the vendor associated therewith; and
  - a processing portion for designating a service package associated with the product and corresponding to the discrete level assigned thereto, and providing an indicia of the service package to the customer, the service package including a designated level of responsibility for the product, corresponding to the discrete level, assumed by the intermediate party in conjunction with purchase of the product selected by the customer; and
  - a processing portion for receiving a selection of the product from the customer, the product selection including the indicia informing the customer of the associated service package.

9. A system according to claim 8 further comprising a processing portion for requiring the vendor to complete at least one of a registration procedure, a qualification procedure, and a vendor agreement procedure prior to the request-receiving processing portion receiving the vendor's request to include the description of the at least one product on the product list.

10. A system according to claim 9 further comprising a processing portion for requiring the vendor to apply the plurality of predetermined criteria to the at least one product.

11. A system according to claim 8 further comprising a processing portion for requiring the customer to complete a registration procedure prior to the customer-providing processing portion providing to the customer the description of any product on the product list corresponding to the specific product.

12. A system according to claim 8 wherein the customer-providing processing portion is further configured to provide a price for each product on the product list corresponding to the specific product to the customer.

13. A system according to claim 8 further comprising a processing portion for facilitating a purchase by the customer of the product on the product list corresponding to the specific product by directing establishment of contact between the customer and the vendor.

14. A system according to claim 8 further comprising a processing portion for facilitating a purchase by the customer of the product on the product list corresponding to the specific product by directing acquisition of the product from the vendor and directing delivery of the product to the customer.

15. A method of indicating relative values of products offered to a customer, said method being implemented by an intermediate party over a computer network and comprising:
- receiving a request to include a description of at least one product on a product list, the request being received over the computer network from a vendor;
- performing a product evaluation for each of the at least one product according to a plurality of predetermined evaluation criteria administered by the intermediate party;
- applying a rating scale having discrete levels to the product evaluation for each of the at least one product in order to correlate the product evaluation with one of the discrete levels so as to thereby assign a corresponding discrete level to each of the at least one product;
- receiving an inquiry regarding a specific product over the computer network from a customer;
- providing to the customer, in response to the inquiry and over the computer network, the description of any product on the product list corresponding to the specific product, each corresponding product description having the respective product evaluation, the associated discrete level; and the vendor associated therewith;
- designating a service package associated with the product and corresponding to the discrete level assigned thereto, and providing an indicia of the service package to the customer, the service package including a designated level of responsibility for the product, corresponding to the discrete level, assumed by the intermediate party in conjunction with purchase of the product selected by the customer; and
- receiving a selection of the product from the customer, the product selection including the indicia informing the customer of the associated service package.

16. A method according to claim 15 further comprising requiring the vendor to complete at least one of a registration procedure, a qualification procedure, and a vendor agreement procedure prior to including the description of at least one product on the product list.

17. A method according to claim 16 further comprising requiring the vendor to apply the plurality of predetermined criteria to the at least one product.

18. A method according to claim 15 further comprising requiring the customer to complete a registration procedure prior to providing to the customer the description of any product on the product list corresponding to the specific product.

19. A method according claim 15 wherein providing to the customer the description or any product on the product list corresponding to the specific product further comprises providing a price for each product on the product list corresponding to the specific product.

20. A method according to claim 15 further comprising facilitating a purchase by the customer of the product on the product list corresponding to the specific product by establishing contact between the customer and the vendor.

21. A method according to claim 15 further comprising facilitating a purchase by the customer of the product on the product list corresponding to the specific product by obtaining the product from the vendor and delivering the product to the customer.

22. An intermediary computer device for use by an intermediary party and to implement a system for indicating relative values of products offered to a customer over a computer network to facilitate a product selection by the customer, the intermediary computer device comprising:
- a processing portion for receiving a request to include a description of at least one product on a product list maintained by the intermediary party, the request being received over the computer network from a vendor computer device;
- a processing portion for performing a product evaluation for each of the at least one product according to a plurality of predetermined evaluation criteria administered by the intermediary party;
- a processing portion for assigning a discrete level according to a rating scale to the product evaluation for each of the at least one product; and
- a processing portion for designating a service package associated with the product and corresponding to the discrete level assigned thereto;
- whereby, for a specific product on the product list inquired by a customer, the corresponding description of the product and the indicia of its associated service package are retrievable for providing to the customer, each corresponding description including the respective established product evaluation, the associated discrete level and a vendor associated therewith, and the service package including a designated level of responsibility for the product corresponding to the discrete level as assumed by the intermediary party.

23. An intermediary computer device configured to implement a system for indicating relative values of products offered to a customer over a computer network, the intermediary computer device being adapted to be used by an intermediate party and being adapted to be in communication over the computer network with a first computer device used by the customer and a second computer device used by a vendor, said intermediary computer device comprising:
- a processing portion for receiving a request to include a description of at least one product on a product list maintained by the intermediate party, the request being received over the computer network from the vendor;
- a processing portion for performing a product evaluation for each of the at least one product according to a plurality of predetermined evaluation criteria administered by the intermediate party;
- a processing portion for applying a rating scale having discrete levels to the product evaluation for each of the at least one product in order to correlate the product evaluation with one of the discrete levels so as to thereby assign a corresponding discrete level to each of the at least one product;
- a processing portion for receiving an inquiry regarding a specific product, the inquiry being received by the intermediate party over the computer network from the customer;
- a processing portion for providing to the customer, in response to the inquiry and over the computer network, the description of any product on the product list corresponding to the specific product, each corresponding product description having the respective established product evaluation, the associated discrete level, and the vendor associated therewith;
- a processing portion for designating a service package associated with the product and corresponding to the discrete level assigned thereto, and providing an indicia of the service package to the customer, the service package including a warranty provision for the product, corresponding to the discrete level, offered by the intermediate party; and
- a processing portion for receiving a selection of the product from the customer, the product selection including the indicia informing the customer of the associated service package.

* * * * *

UNITED STATES PATENT AND TRADEMARK OFFICE
CERTIFICATE OF CORRECTION

PATENT NO. : 7,103,567 B2  
APPLICATION NO. : 09/908095  
DATED : September 5, 2006  
INVENTOR(S) : Smukowski Page 1 of 1

It is certified that error appears in the above-identified patent and that said Letters Patent is hereby corrected as shown below:

Column 14,
Line 67, "or" should read --of--.

Column 15,
Line 32, after "thereto;" insert --and a processing portion for receiving a selection of the product from the customer, the product selection including an indicia informing the customer of the associated service package.--.

Signed and Sealed this

Twenty-fifth Day of August, 2009

David J. Kappos
*Director of the United States Patent and Trademark Office*